(12) United States Patent
Majmundar et al.

(10) Patent No.: US 11,032,744 B2
(45) Date of Patent: Jun. 8, 2021

(54) INTER-DISTRIBUTED UNIT BEAM SWITCH PROCEDURE TRIGGERED BY RADIO LINK INTERRUPTION

(71) Applicant: AT&T Intellectual Property I, L.P., Atlanta, GA (US)

(72) Inventors: Milap Majmundar, Austin, TX (US); Thomas Novlan, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/587,388

(22) Filed: May 4, 2017

(65) Prior Publication Data
US 2018/0323842 A1   Nov. 8, 2018

(51) Int. Cl.
*H04W 36/30* (2009.01)
*H04W 36/06* (2009.01)
(Continued)

(52) U.S. Cl.
CPC ........ *H04W 36/0011* (2013.01); *H04B 7/022* (2013.01); *H04B 7/0602* (2013.01);
(Continued)

(58) Field of Classification Search
CPC ............................ H04B 7/061; H04W 36/0011
See application file for complete search history.

(56) References Cited

U.S. PATENT DOCUMENTS 5,937,019 A * 8/1999 Padovani .............. H04W 36/30
                                                       375/358
6,128,486 A   10/2000 Keskitalo et al.
(Continued)

FOREIGN PATENT DOCUMENTS

CA        2975069 A1    8/2016
CN      101185200 B     7/2011
(Continued)

OTHER PUBLICATIONS

Capone et al., "Context information for fast cell discovery in mm-wave 5G networks." European Wireless 2015; 21th European Wireless Conference; Proceedings of VDE, 2015. https://arxiv.org/pdf/1501.02223. Retrieved on May 22, 2017, 6 pages.
(Continued)

*Primary Examiner* — Andrew Lai
*Assistant Examiner* — M Mostazir Rahman
(74) *Attorney, Agent, or Firm* — Amin, Turocy & Watson, LLP

(57) ABSTRACT

The described technology is generally directed towards overcoming a radio link interruption event, for example caused in the mmWave spectrum by a physical blockage between user equipment and a communications network distributed unit. Described is executing an inter-distributed unit beam switch in response to a radio link interruption trigger when no beams are available to support the user equipment from the distributed unit currently serving the user equipment. The inter-distributed unit beam switch may be performed by notifying a flow control process of the radio link interruption, which can switch to a different distributed unit such as selected by beam quality measurements.

20 Claims, 11 Drawing Sheets

(51) Int. Cl.
*H04W 36/00* (2009.01)
*H04B 7/022* (2017.01)
*H04B 7/06* (2006.01)

(52) U.S. Cl.
CPC ........ *H04B 7/0617* (2013.01); *H04W 36/305* (2018.08); *H04W 36/06* (2013.01)

(56) References Cited

U.S. PATENT DOCUMENTS

| | | | |
|---|---|---|---|
| 6,167,286 | A | 12/2000 | Ward et al. |
| 6,871,071 | B2 | 3/2005 | Takao et al. |
| 7,079,843 | B2 | 7/2006 | Iacono et al. |
| 7,242,955 | B2 | 7/2007 | Frank et al. |
| 7,308,264 | B2 | 12/2007 | Stern-berkowitz et al. |
| 7,324,817 | B2 | 1/2008 | Iacono et al. |
| 7,460,834 | B2 | 12/2008 | Johnson et al. |
| 8,238,835 | B2 | 8/2012 | Nagai et al. |
| 8,244,254 | B2 | 8/2012 | Kashiwase |
| 8,265,702 | B2 | 9/2012 | Iacono et al. |
| 8,280,375 | B2 | 10/2012 | Du et al. |
| 8,750,896 | B2 | 6/2014 | Brisebois et al. |
| 9,094,977 | B2 | 7/2015 | Li et al. |
| 9,319,890 | B2 | 4/2016 | Brisebois et al. |
| 9,344,234 | B2 | 5/2016 | Lin et al. |
| 9,444,692 | B2 | 9/2016 | Lehane |
| 9,491,764 | B1 | 11/2016 | Ross et al. |
| 9,497,673 | B2 | 11/2016 | Blankenship |
| 9,578,671 | B2 | 2/2017 | Blankenship |
| 9,596,612 | B2 | 3/2017 | Brisebois et al. |
| 9,674,852 | B2 | 6/2017 | Heo |
| 9,699,802 | B2 | 7/2017 | Vannithamby |
| 10,021,597 | B2 | 7/2018 | Majmundar |
| 10,206,142 | B2 | 2/2019 | Majmundar |
| 2001/0018342 | A1 | 8/2001 | Vialen et al. |
| 2006/0246907 | A1* | 11/2006 | Kaikkonen ........... H04W 36/18 455/442 |
| 2006/0276229 | A1 | 12/2006 | Braun et al. |
| 2011/0021154 | A1 | 1/2011 | Marinier et al. |
| 2012/0213106 | A1 | 8/2012 | Boehm |
| 2013/0040692 | A1 | 2/2013 | Chen et al. |
| 2013/0121185 | A1 | 5/2013 | Li et al. |
| 2014/0073337 | A1 | 3/2014 | Hong et al. |
| 2014/0192740 | A1 | 7/2014 | Ekpenyong |
| 2014/0247731 | A1 | 9/2014 | Nagaraj |
| 2014/0293896 | A1 | 10/2014 | Kuo |
| 2014/0342748 | A1 | 11/2014 | Zou |
| 2015/0139195 | A1 | 5/2015 | Xiao et al. |
| 2015/0181473 | A1 | 6/2015 | Horn |
| 2015/0215912 | A1 | 7/2015 | Jha |
| 2015/0256300 | A1 | 9/2015 | Lin et al. |
| 2015/0318916 | A1 | 11/2015 | Gopal et al. |
| 2015/0382290 | A1 | 12/2015 | Yaacoub |
| 2016/0057800 | A1 | 2/2016 | Ingale |
| 2016/0066233 | A1 | 3/2016 | Balachandran |
| 2016/0095004 | A1 | 3/2016 | Tseng |
| 2016/0150435 | A1 | 5/2016 | Baek et al. |
| 2016/0198383 | A1 | 7/2016 | Worrall |
| 2016/0234714 | A1 | 8/2016 | Basu |
| 2016/0255665 | A1 | 9/2016 | Futaki |
| 2016/0353510 | A1* | 12/2016 | Zhang ................ H04L 43/16 |
| 2016/0381609 | A1 | 12/2016 | Alriksson et al. |
| 2017/0006539 | A1 | 1/2017 | Kakishima et al. |
| 2017/0019903 | A1* | 1/2017 | Talukdar ............. H04B 7/086 |
| 2017/0041968 | A1 | 2/2017 | Jin |
| 2017/0071023 | A1 | 3/2017 | Kunz |
| 2017/0164281 | A1 | 6/2017 | Chiba |
| 2017/0188248 | A1 | 6/2017 | Muller |
| 2017/0289867 | A1 | 10/2017 | Fan et al. |
| 2018/0091262 | A1* | 3/2018 | Jung ..................... H04L 1/06 |
| 2018/0199328 | A1* | 7/2018 | Sang .................. H04B 7/0617 |
| 2018/0212651 | A1 | 7/2018 | Li et al. |
| 2018/0249526 | A1 | 8/2018 | Nagaraja et al. |
| 2018/0279169 | A1* | 9/2018 | Wang ..................... H04L 1/20 |
| 2019/0174355 | A1 | 6/2019 | Majmundar |

FOREIGN PATENT DOCUMENTS

| | | |
|---|---|---|
| EP | 3 120 659 A2 | 1/2017 |
| EP | 2 995 163 B1 | 3/2017 |
| EP | 3 178 290 A1 | 6/2017 |
| KR | 100749448 A1 | 8/2007 |
| KR | 20180033017 * | 9/2016 |
| WO | 2015/018494 A1 | 2/2015 |
| WO | 2016055102 A1 | 4/2016 |
| WO | 2016/180612 A1 | 11/2016 |
| WO | 2016198124 A1 | 12/2016 |
| WO | 2017010644 A1 | 1/2017 |
| WO | 2017034607 A1 | 3/2017 |

OTHER PUBLICATIONS

Shariat et al. "5G radio access above 6 GHz." Transactions on Emerging Telecommunications Technologies 27.9 (2016): 1160-1167. http://eprints.networks.imdea.org/1532/1/5G_radio_access_above_6GHz_2016_EN.pdf. Retrieved on May 22, 2017, 8 pages.

Giordani et al. "Uplink-based framework for control plane applications in 5G mmWave cellular networks." arXiv reprint arXiv:1610.04836 (2016). https://arxiv.org/pdf/1610.04836. Retrieved on May 22, 2017, 31 pages.

Halbauer et al. "Architectural aspects of mm-wave radio access integration with 5G ecosystem." 5G PPP mmMAGIC, 2016. http://eprints.networks.imdea.org/1533/1/mm-wave_architecture_white_paper.pdf. Retrieved on May 22, 2017, 17 pages.

Gimenez, "Mobility Management for Cellular Networks: From LTE Towards 5G" Jan. 2017, 308 pages.

Halbauer et al. "Millimetre-Wave Based Mobile Radio Access Network for Fifth Generation Integrated Communications", Jun. 30, 2017, 85 pages.

Rugeland et al., "Architectural enablers and concepts for mm-wave RAN integration" 5G PPP mmMAGIC, Mar. 29, 2017, 26 pages.

Thapliyal, "Mobility Robustness in 5G Networks" Aalto University School of Electrical Engineering Aug. 12, 2016, 58 pages.

Ericsson, AT&T, "Mechanism for fast retransmission of lost PDUs" 3GPP TSG-RAN WG3 #97, Tdoc R3-173235, Berlin, Germany, Aug. 21-25, 2017, 5 pages.

Ericsson, "0 ms interruption support during handover procedure in NR" 3GPP TSG-RAN WG2 #99, R2-1708028 (Resubmission of R2-1706625), Berlin, Germany, Aug. 21-25, 2017, 7 pages.

Office Action for U.S. Appl. No. 15/587,237 dated Sep. 4, 2018, 45 pages.

Office Action for U.S. Appl. No. 15/721,258 dated Oct. 29, 2018, 30 pages.

3rd Generation Partnership Project. "3GPP TR 38.912 V1.0.0: Study on New Radio (NR) Access Technology." 3GPP, Mar. 2017. 74 pages.

Singh, et al. "Proportional Fair Traffic Splitting and Aggregation in Heterogeneous Wireless Networks." arXiv:1508.05542v2 [cs.NI] Mar. 26, 2016. 4 pages.

Final Office Action received for U.S. Appl. No. 15/587,237 dated Mar. 20, 2019, 47 pages.

Final Office Action received for U.S. Appl. No. 15/721,258 dated Mar. 11, 2019, 20 pages.

Non-Final Office Action received for U.S. Appl. No. 15/587,237 dated Jul. 12, 2019, 38 pages.

Non-Final Office Action received for U.S. Appl. No. 16/669,498 dated Dec. 20, 2019, 31 pages.

* cited by examiner

INTER-DISTRIBUTED UNIT BEAM SWITCH PROCEDURE TRIGGERED BY RADIO LINK INTERRUPTION

BACKGROUND

New radio (NR) networks such as fifth generation (5G) NR networks are designed for deployment in the radio frequency spectrum between 30 GHz and 300 GHz, referred to as the millimeter wave (mmWave) spectrum. Unlike other mobile communication frequency ranges, in the mmWave spectrum, the beam pair between the network (via a distributed unit) and the user equipment may experience a blockage, such as due to a physical obstruction, which interrupts their communication. Such an interruption is typically temporary, and is referred to herein as a radio link interruption.

Contemporary procedures switch from one distributed unit to another via a full radio resource control level (layer 3) handoff (also referred to as a handover). Such procedures do not take into account the relatively newly observed phenomenon of radio link interruptions.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
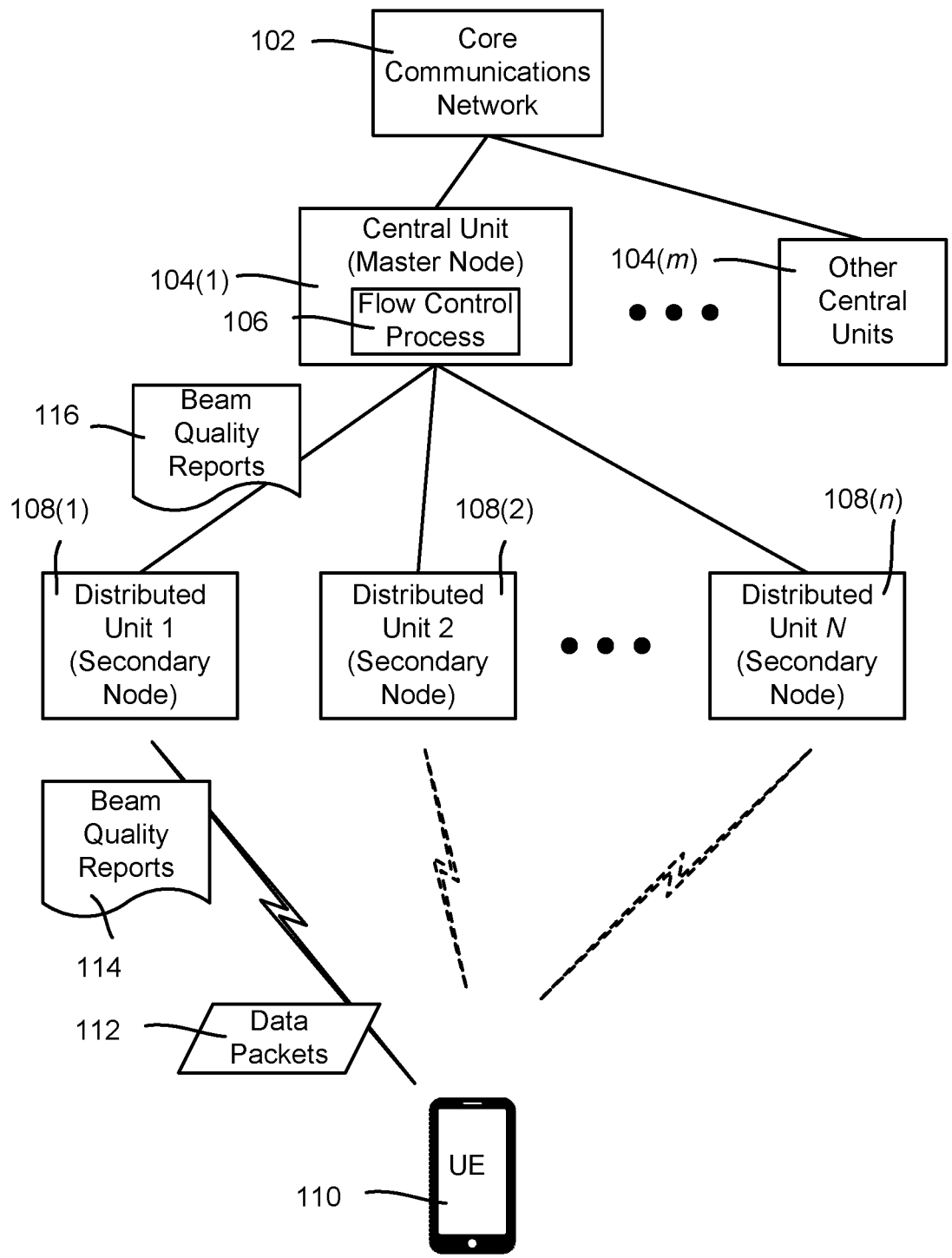
FIG. 1 is an example block diagram representation of a user equipment communicating with a distributed unit of a group of distributed units coupled to a central unit of a core communications network, according to one or more example implementations.

Briefly, one or more aspects of the technology described herein are generally directed towards receiving, by a communication network device of a communications network and comprising a processor, information corresponding to a radio link interruption of a communication of data flow packets between a user equipment and a first distributed unit of distributed units of the communications network. In response to the receiving the information corresponding to the radio link interruption, aspects include executing, by the communication network device, an inter-distributed unit beam switch, comprising determining a target distributed unit of the distributed units based on a selection criterion, wherein the target distributed unit is different from the first distributed unit, and facilitating communicating the data flow packets between the user equipment and the target distributed unit.

In this regard, various aspects of the technology described herein are generally directed towards a mobility solution for inter-distributed unit switching that takes into account radio link interruption events that correspond to signal blockages in the mmWave spectrum. In one or more implementations, the inter-distributed unit switch solution comprises a procedure which, in general, operates upon a detected radio link interruption event being detected by a distributed unit and reported to a central unit coupled to the distributed unit and other distributed units. The reported event indicates the request for (that is, the event triggers) an inter-distributed unit beam switch.

To switch the beams, the central unit selects a target distributed unit based on at least one selection criterion, such as beam measurements reported by the user equipment. After determining the target distributed unit, the central unit checks whether there is dual/multi-connectivity (for brevity, generally referred to herein as "multiple connectivity" or "multi-connectivity"—which includes dual connectivity as well as more than dual connectivity) for this user equipment already established with the target distributed unit. If multiple connectivity is not already established, then the central unit initiates a standard secondary node (SgNB) addition procedure (SgNB addition) as specified by 3GPP standards to establish connectivity with the target distributed unit. Once multiple connectivity is established with the target distributed unit, a multiple connectivity flow control process (e.g., comprising an algorithm) can stop sending packets to the "old" distributed unit and switch the data flow to the target distributed unit.

If instead multiple connectivity is already established between a set of distributed units, when there is a radio link interruption event, the inter-distributed unit switch procedure relies on the multiple connectivity flow control process. As a result, a distributed unit switch can be potentially much faster relative to other switching procedures. More particularly, the operation of a flow control process 106 at the PDCP layer splits the data bearer across the master node B (MgNB) and secondary gNBs (SgNBs). Other flow control algorithms for dual/multi connectivity may require the SgNB to feed back information to the MgNB regarding SgNB buffer status, SgNB UE throughput, and the like. In mmWave-based networks, when there is inter-distributed unit mobility as described herein, the flow control process may consider one or more of the following additional factors, including the radio link interruption report sent from the secondary node (SgNB) to the master node (MgNB), the beam quality of beams measured and reported by the user equipment for the distributed units in the multi-connectivity set for the user equipment, and/or beam quality restoration indications sent from a distributed unit in the multi-connectivity set.

As will be understood, the technology described herein enables a layer-2 based mobility procedure that may be faster than a traditional layer-3 based mobility procedure. The technology described herein takes into account radio link interruption events that are experienced in mmWave spectrum-based mobile networks. The technology described herein considers the addition or deletion of distributed units in a user equipment's dual/multi-connectivity set in response to radio link interruption indication/report and beam restoration indication. The technology described herein provides enhancements to conventional dual/multi-connectivity flow control algorithms by taking into account radio link interruption indication, beam quality, and beam restoration indication.

It should be understood that any of the examples herein are non-limiting. For instance, the examples are based on mmWave spectrum communications between a user equipment exemplified as a smartphone or the like and communications network device; however virtually any communications devices may benefit from the technology described herein, and/or their use in different spectrums may likewise benefit. Thus, any of the embodiments, aspects, concepts, structures, functionalities or examples described herein are non-limiting, and the technology may be used in various ways that provide benefits and advantages in radio communications in general.

FIG. 1 generally shows a core communications network 102 that is coupled to one or more network devices comprising central units 104(1)-104(m), also referred to as master nodes. For purposes of explanation, operations and structure of the central unit 104(1) are described, and it is understood that other central units may operate similarly. In FIG. 1, the central unit 104(1) runs a flow control process 106 (e.g., including a flow control algorithm).

In FIG. 1, the central unit 104(1) is communicatively coupled to a group of distributed units 108(1)-108(n), also referred to as secondary nodes. A user equipment (UE) 110 (e.g., a smartphone) is shown as communicating data packets 112 with the communications network via the distributed unit 108(1). The user equipment 110 also sends beam quality reports 114 to the distributed unit 108(1), generally including beam quality reports of other distributed units, including those not being used for data communication. Copies 116 or the like of these beam quality reports are sent to the central unit 104(1)/the flow control process 106.

Figure 2:
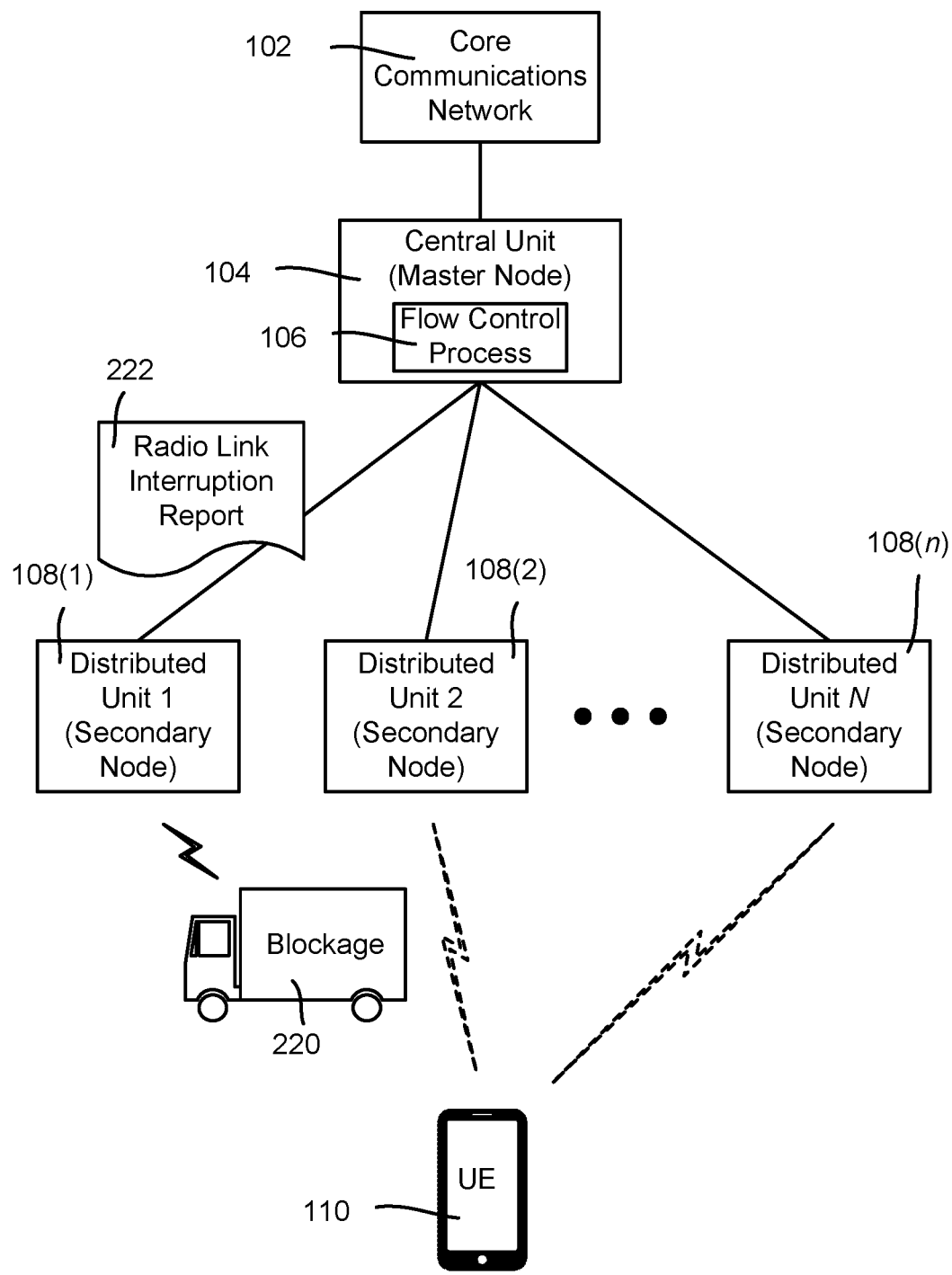
FIG. 2 is an example block diagram representation of a radio link interruption blocking communication between the user equipment and a distributed unit, according to one or more example implementations.

As generally represented in FIG. 2, a blockage 220 such as a physical obstruction may cause a radio link interruption event. When this occurs, the distributed node 108(1), which was actively communicating with the user equipment 110, detects the radio link interruption event and sends a radio link interruption report 222 to the central unit 104/flow control process 106.

Figure 3:
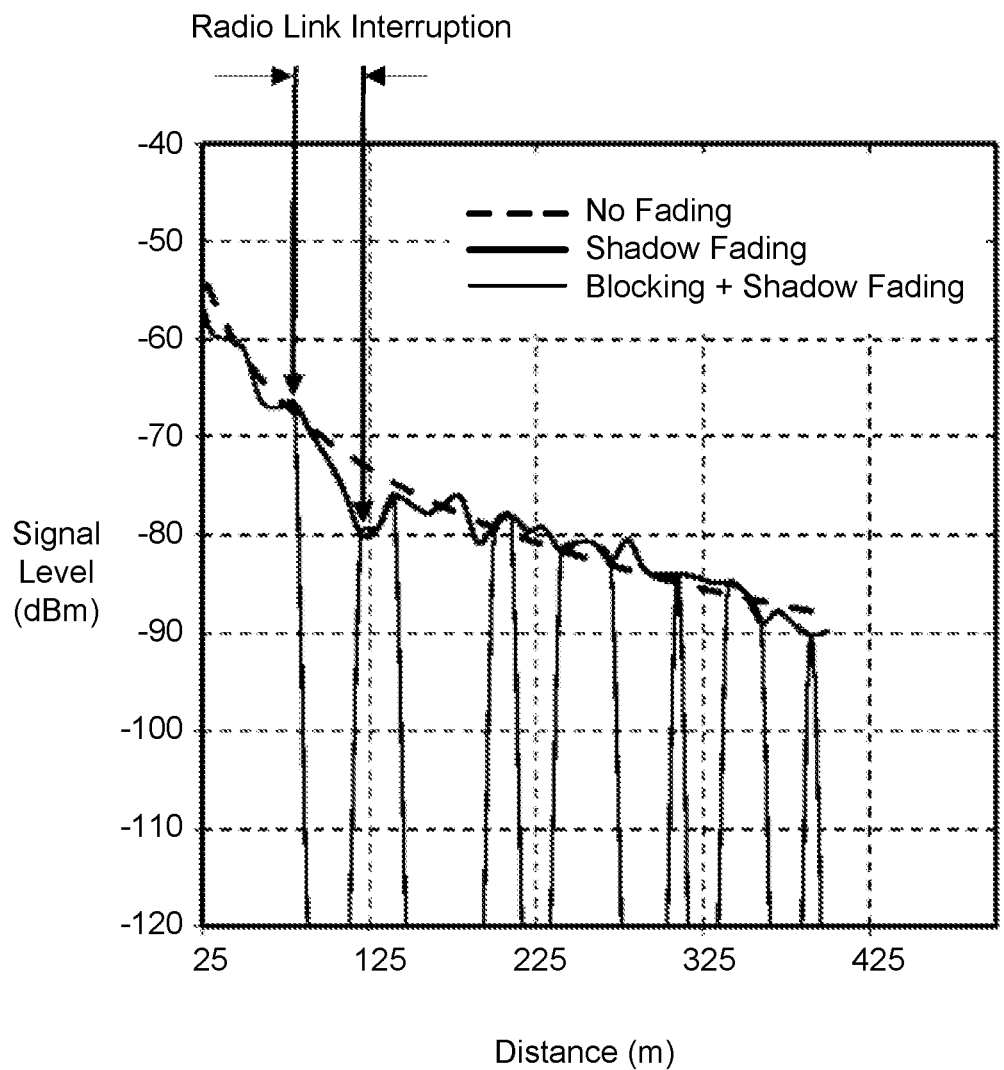
FIG. 3 is an example graphical representation representing a drop in signal level as a result of a radio link interruption, according to one or more example implementations.

More particularly, as generally represented in FIG. 3, sudden sharp drops in signal strength (E.G., on the order of 30 dB) may occur, typically due to physical objects blocking the link between the user equipment-to-transmit receive point (TRP) of a distributed unit. As is known, a "beam failure event" occurs when the quality of beam pair link(s) of an associated control channel (e.g., NR-PDCCH) falls low enough, such as based on a comparison with a threshold, and/or time-out of an associated timer. When a radio link related failure event is a blockage-based beam failure event, this is referred to herein as a radio link interruption (RLI) event, to represent the fact that in a blockage-based beam failure event, the beam quality is typically 'interrupted' for a relatively short period of time, and is eventually restored after the blockage event is over, as illustrated in FIG. 3.

An RLI event cannot be detected directly by beam failure (BF) or traditional radio link failure (RLF) procedures. However, if fast beam switching mechanisms are in place as part of normal beam management procedures, a user equipment may not need to directly detect that it is experiencing a radio link interruption event. This is generally because at the beginning of a radio link interruption event, when a user equipment detects beam failure, the user equipment possibly may trigger an attempt to switch beams. This can result in a situation in which there is an available beam from the same TRP, whereby it may be possible to execute an intra-TRP beam switch. However this is often not the case with a blockage event. Handover is another possibility, but this is relatively slow.

Figure 4:
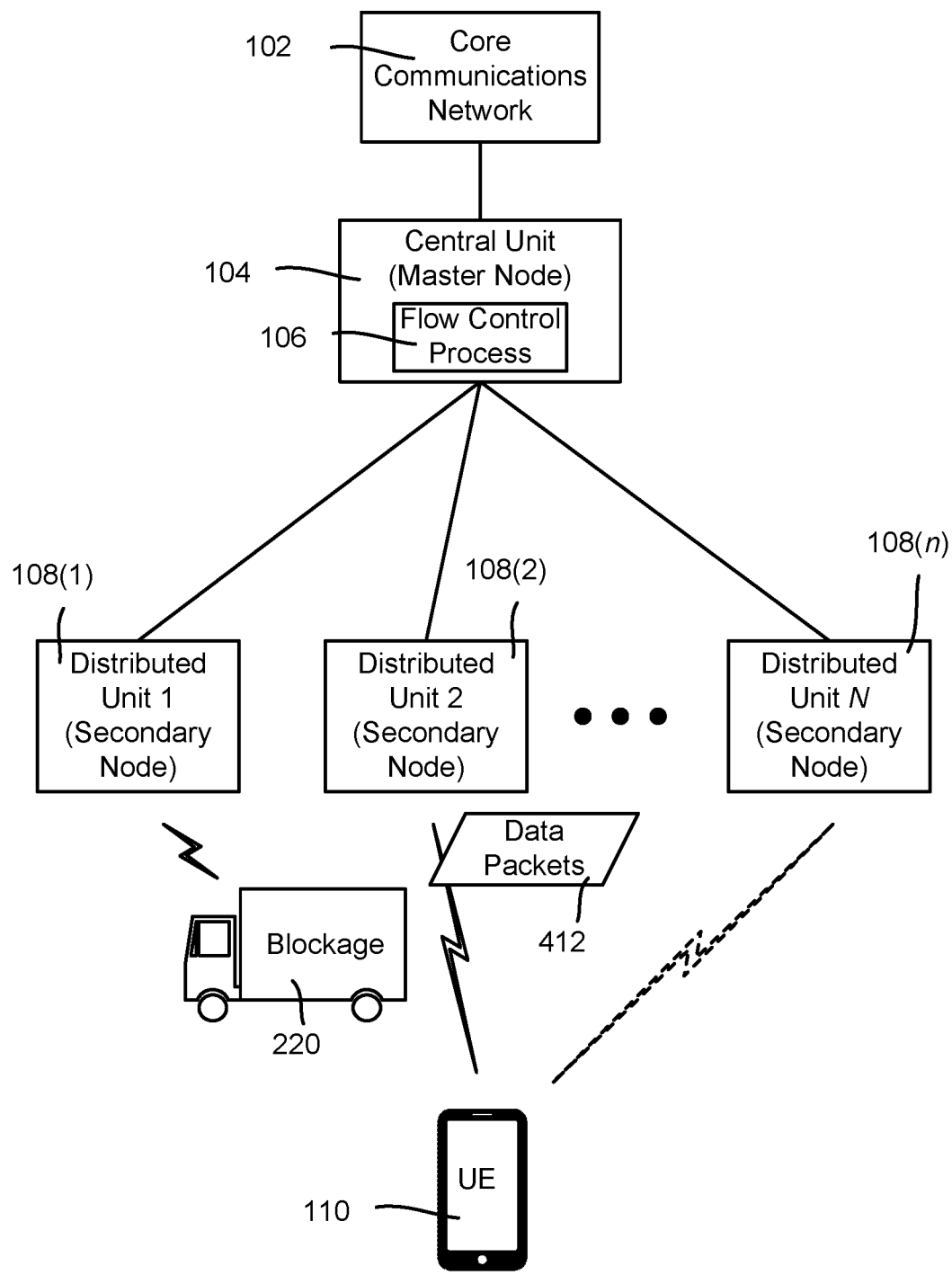
FIG. 4 is an example block diagram representation of a user equipment communicating with a switched to beam of a selected target distributed unit, to avoid the radio link interruption, according to one or more example implementations.

Thus, described herein is a technology to handle beam failure/radio link interruption events between multiple distributed units under a multi-connectivity framework involving mobility faster than handover. The technology described herein provides a procedure for executing an inter-distributed unit beam switch in response to a radio link interruption trigger when no beams are available to support the user equipment from the current serving distributed unit. To this end, as generally represented in FIGS. 2 and 4, when the serving beam to the distributed unit 108(1) fails causing a radio link interruption trigger, and no other beam is available from the distributed unit 108(1), switching to a beam that is available via a different distributed unit is performed, shown as the distributed unit 108(2) in FIG. 4, communicating data packets 412. Note that beam quality reports are similarly sent by the user equipment 110 to the central unit 104 via the distributed unit 108(2), but are not shown in FIG. 4 for purposes of clarity.

Figure 5:
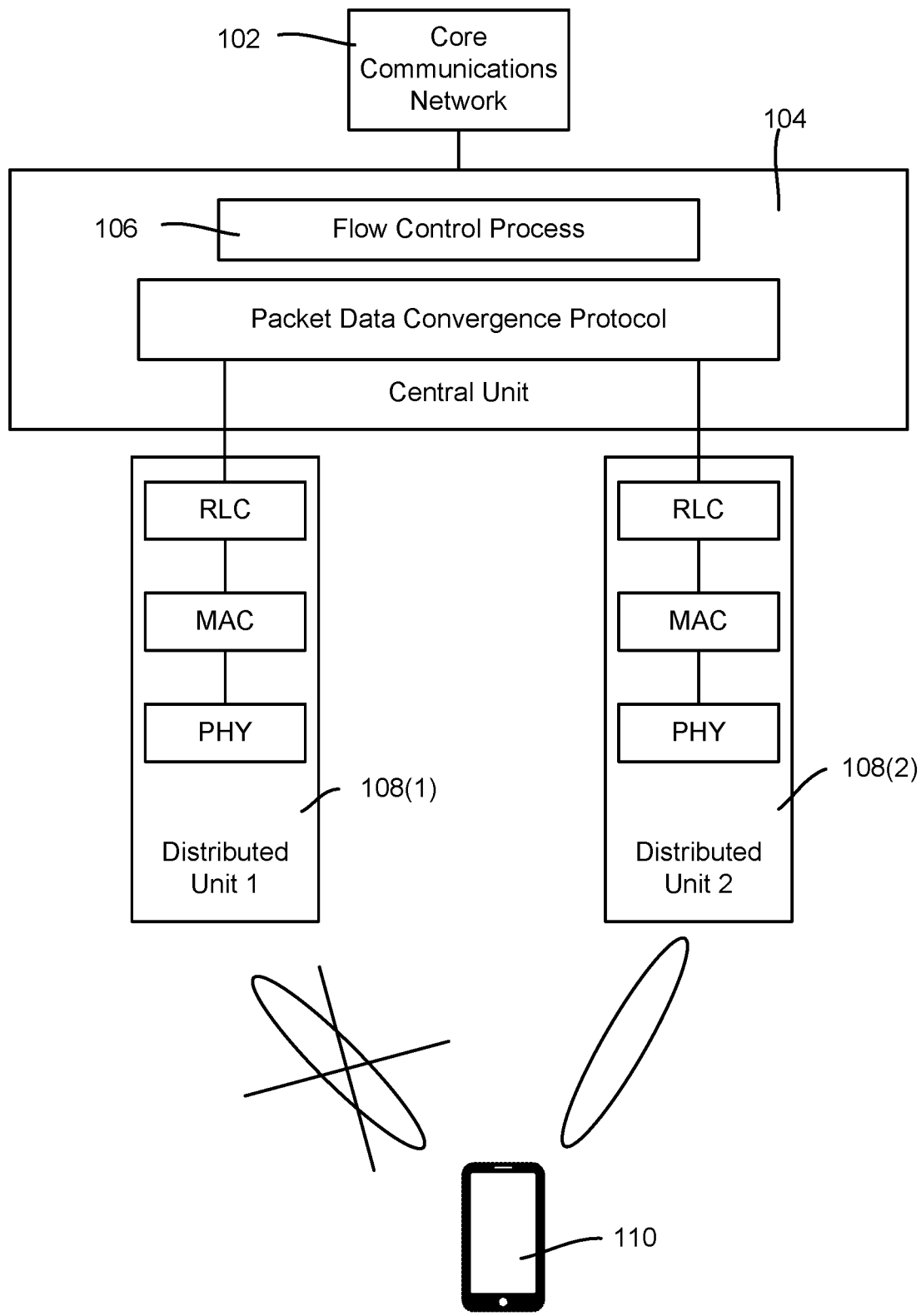
FIGS. 5 and 6 are example block diagram representations showing other aspects of inter-distributed unit beam switching, according to one or more example implementations
Figure 6:
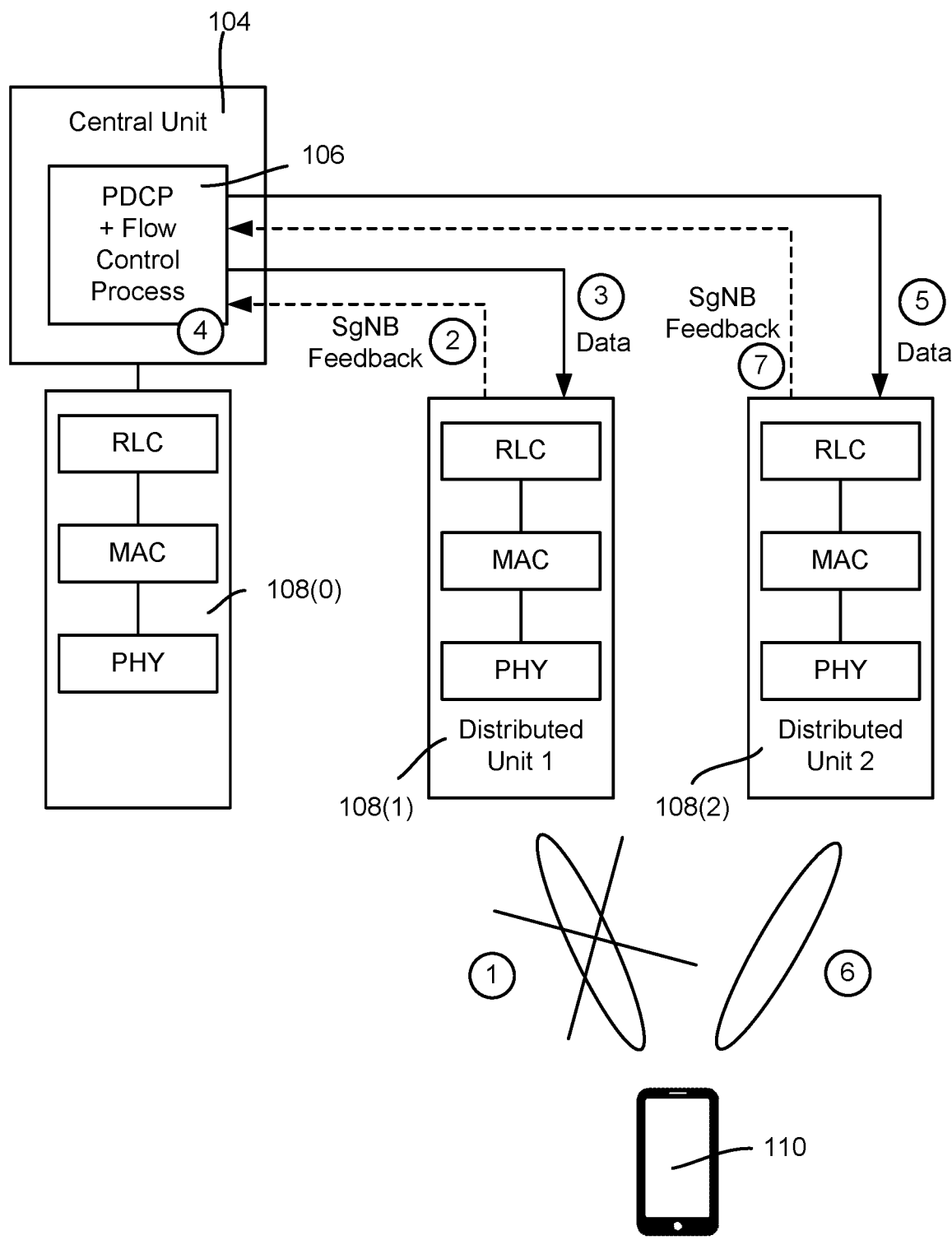

FIGS. 5 and 6 exemplify alternative representation of such a radio link interruption and switch procedure, showing additional features such as the RLC, MAC and PHY layers in the distributed units and the packet data convergence protocol (PDCP) in the central unit 104. In FIGS. 5 and 6, the beams are represented by ovals between the distributed units and the user equipment 110, with the crossed-out oval representing the radio link interruption condition.

In FIG. 6, the user equipment is communicating via the distributed unit 108(1), that is, being served by secondary node SgNB1, as represented by the circled numeral one. This results in secondary node feedback to the central unit represented by numeral two, and data to the distributed unit represented by numeral three. When a radio link interruption event occurs, the feedback indicates this condition, as represented by the circled numeral four; (in other words, SgNB1 experiences RLI and sends an RLI report to MgNB, which provides an RLI indication to the flow control process).

Figure 7A:
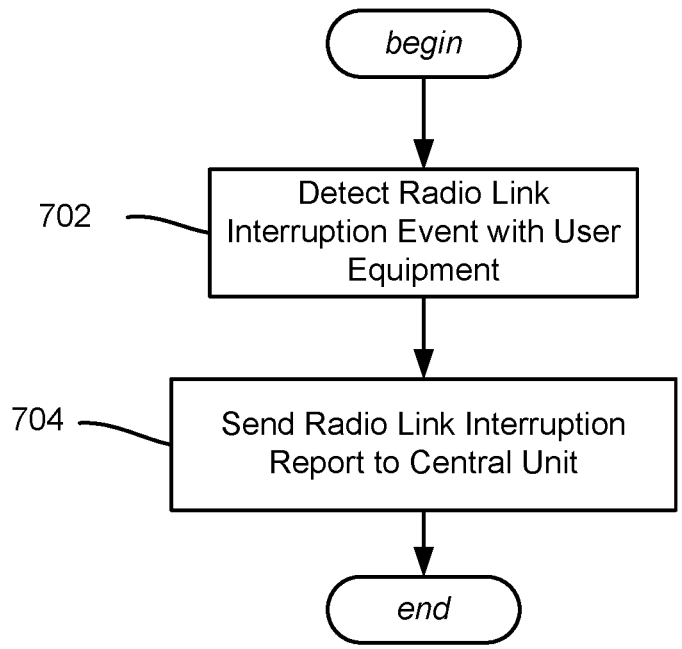
FIG. 7A is an example flow diagram representation of reporting a radio link interruption from a distributed unit to a central unit, according to one or more example implementations.

A switch over occurs to the distributed unit 108(2) as described herein and as represented in FIG. 6 by circled numerals five through seven. More particularly, the flow control process stops sending data packets to the blocked secondary node, SgNB1, selects a new secondary node (e.g., SgNB2 based on measurements) as the target DU, and diverts data packets to SgNB2. The above operations can be generalized for a subset of n SgNBs FIG. 7A represents example operations of a distributed unit, exemplified as steps, when a radio link interruption event is detected, as represented by step 702. When this occurs, step 704 sends a radio link interruption report to the central unit.

Figure 8:
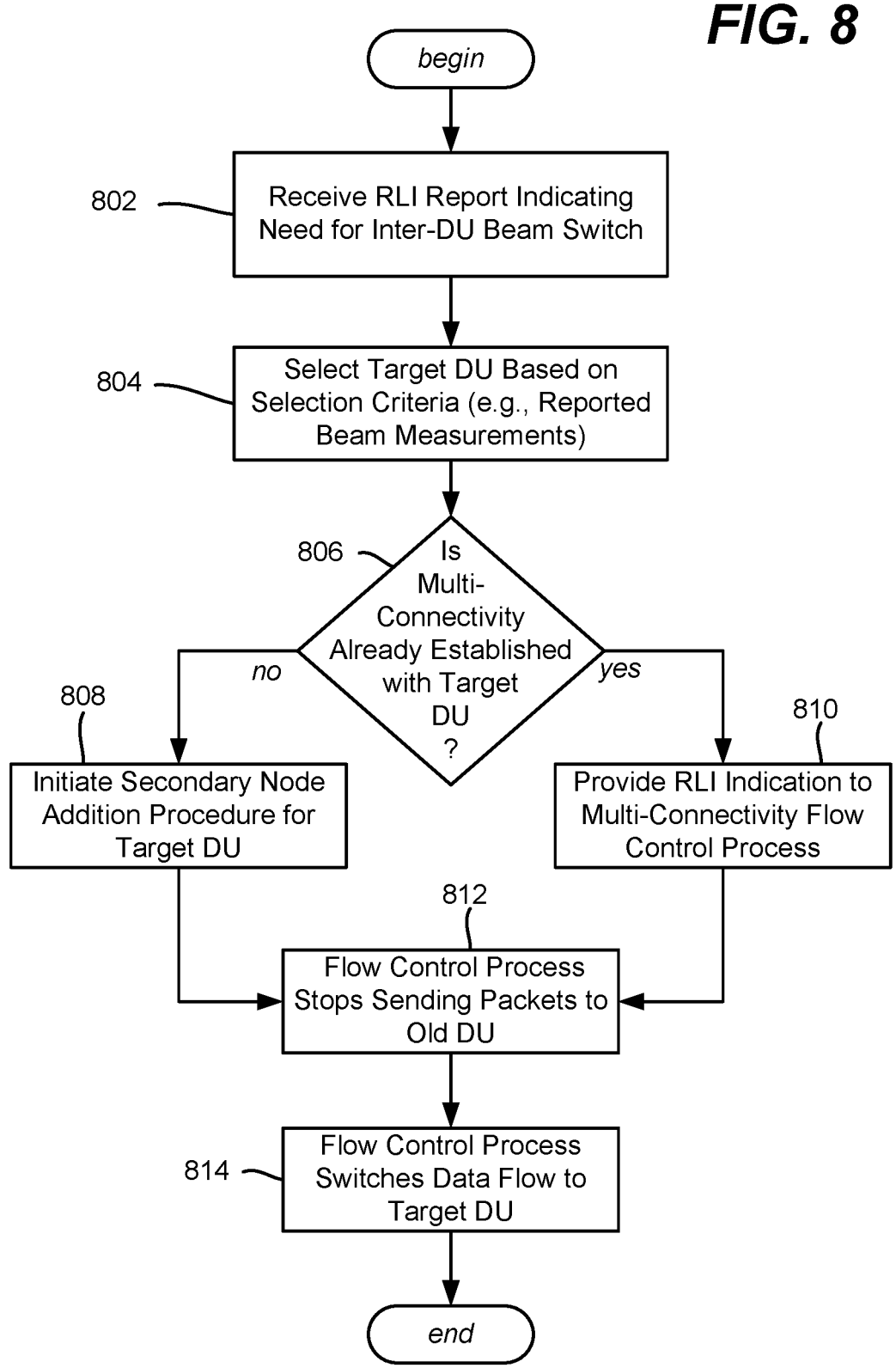
FIG. 8 is an example flow diagram representation of inter-distributed unit switching procedure in response to a radio link interruption trigger, according to one or more example implementations.

When received, an inter-distributed unit beam switch may be executed using the operations generally exemplified as steps in FIG. 8. Step 802 represents receiving the radio link interruption (RLI) report. Step 804 selects a target distributed unit (DU) based on selection criterion or criteria. Typically the selection criterion is based on the reported beam measurements, but may also include concepts such as previous radio link interruptions, current load being handled by a distributed unit, and other considerations.

After selecting the target distributed unit, the central unit checks at step 806 whether there is multiple connectivity (that is, dual/multi-connectivity) for this user equipment already established with the target distributed unit. If multiple connectivity is not already established, then at step 808 the central unit initiates a secondary node addition procedure, such as the standard SgNB addition as specified by 3GPP standards. Once multiple connectivity is established with the target distributed unit, the dual/multi-connectivity flow control process can stop sending packets to the old distributed unit (step 812) and switch the data flow to the target distributed unit (step 814).

If instead at step 806 multiple connectivity is already established between a set of distributed units, the inter-distributed unit switch procedure relies on the dual/multi connectivity flow control process to make the switch. To this end, to expedite the switch, step 810 provides a radio link interruption indication to the dual/multi connectivity flow control process, whereby the process may operate virtually immediately and such a distributed unit switch is potentially much faster than other switching procedures.

Figure 7B:
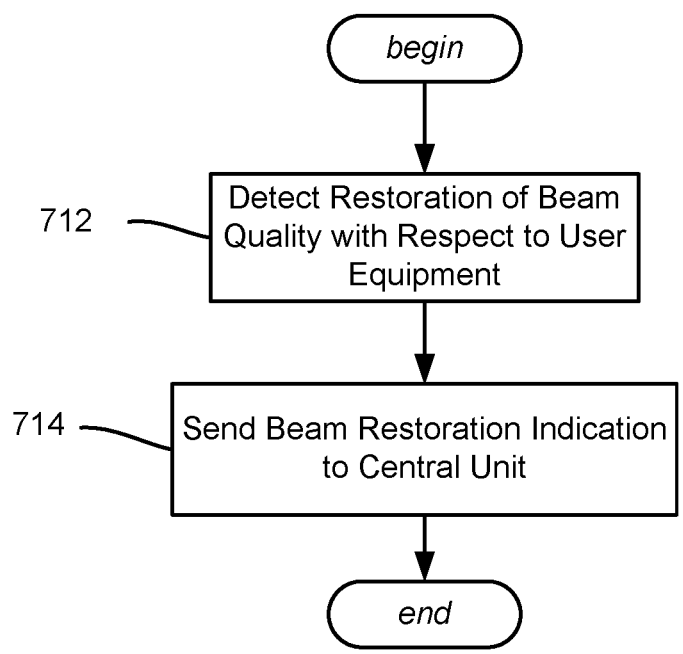
FIG. 7B is an example flow diagram representation of reporting restoration of a quality beam following a radio link interruption from a distributed unit to a central unit, according to one or more example implementations.

Turning to another aspect, beam quality restoration refers to a situation in which the beam switch has been completed, and subsequently the radio link interruption event has ended, whereby the beam quality of the beam from the original distributed unit is restored. It is possible that the current beam measurements reports may indicate better beam quality for the beam from the distributed unit 108(1), for example. Such a restoration of beam quality from a distributed unit that is in a user equipment's multi-connectivity set may be indicated by the distributed unit to the central unit/master node (MgNB) as part of its feedback to the central unit, as generally represented by steps 712 and 714 of FIG. 7B.

Figure 9:
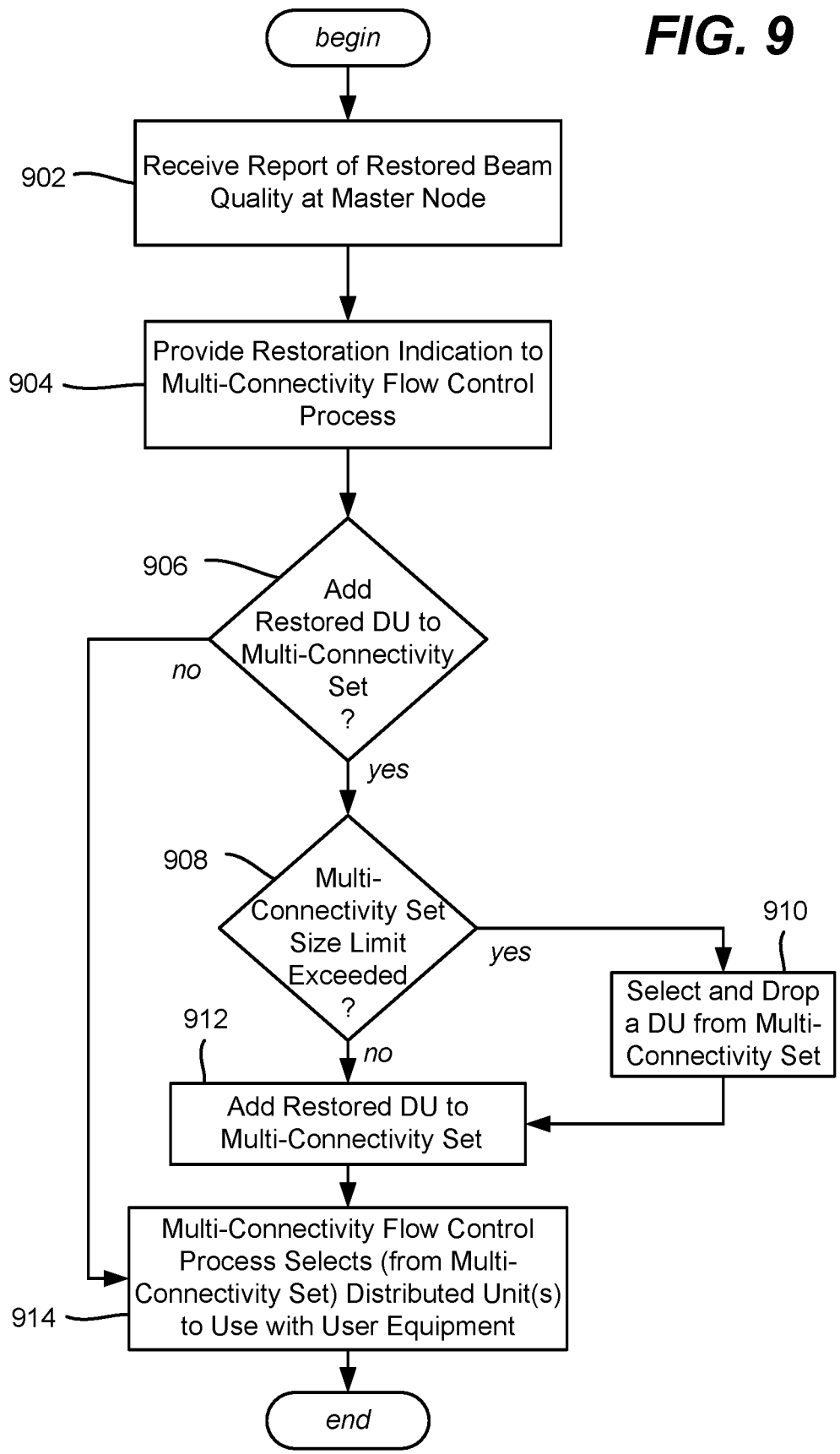
FIG. 9 is an example flow diagram representation of operations that may be taken in response to restoration from a radio link interruption event, according to one or more example implementations.

FIG. 9 represents such a restoration procedure's operations, beginning at step 902 where the report of restored beam quality is received. At step 904, a restoration indication is provided to the multiple connectivity flow control process. Step 906 represents determining whether to add the restored distributed unit to the user equipment's multi-connectivity set. If not, step 906 branches to step 914 where the flow control process operates in a typical manner to decide and use one or more distributed units for communicating with the user equipment.

If instead step 906 decides to add the restored distributed unit, step 908 evaluates for a situation in which there is a limited size to the user equipment connectivity set. More particularly, the user equipment may have certain capability restrictions related to the number of distributed units with which it can simultaneously maintain multi-connectivity. Steps 908, 910 and 912 take such user equipment capability into account while determining whether to add a distributed unit to the multi-connectivity set. That is, a restored distributed unit may be added or not (steps 906 and 912), and if to be added and the set is full, and other distributed may be dropped from the multi-connectivity set (steps 908 and 910).

In this way, based on this beam restoration indication from the original distributed unit, the multi-connectivity flow control process may dynamically switch the data flow back to the distributed 108(1). Alternatively, because step 914 allows the flow control process to operate as configured with respect to distributed unit selection, the process instead may decide to split the data flow between distributed units for up to n distributed units, such as based on any number of criterion including, but not limited to, relative quality of beams, history of radio link interruption reports, load and capability of distributed units, and so forth.

Figure 10:
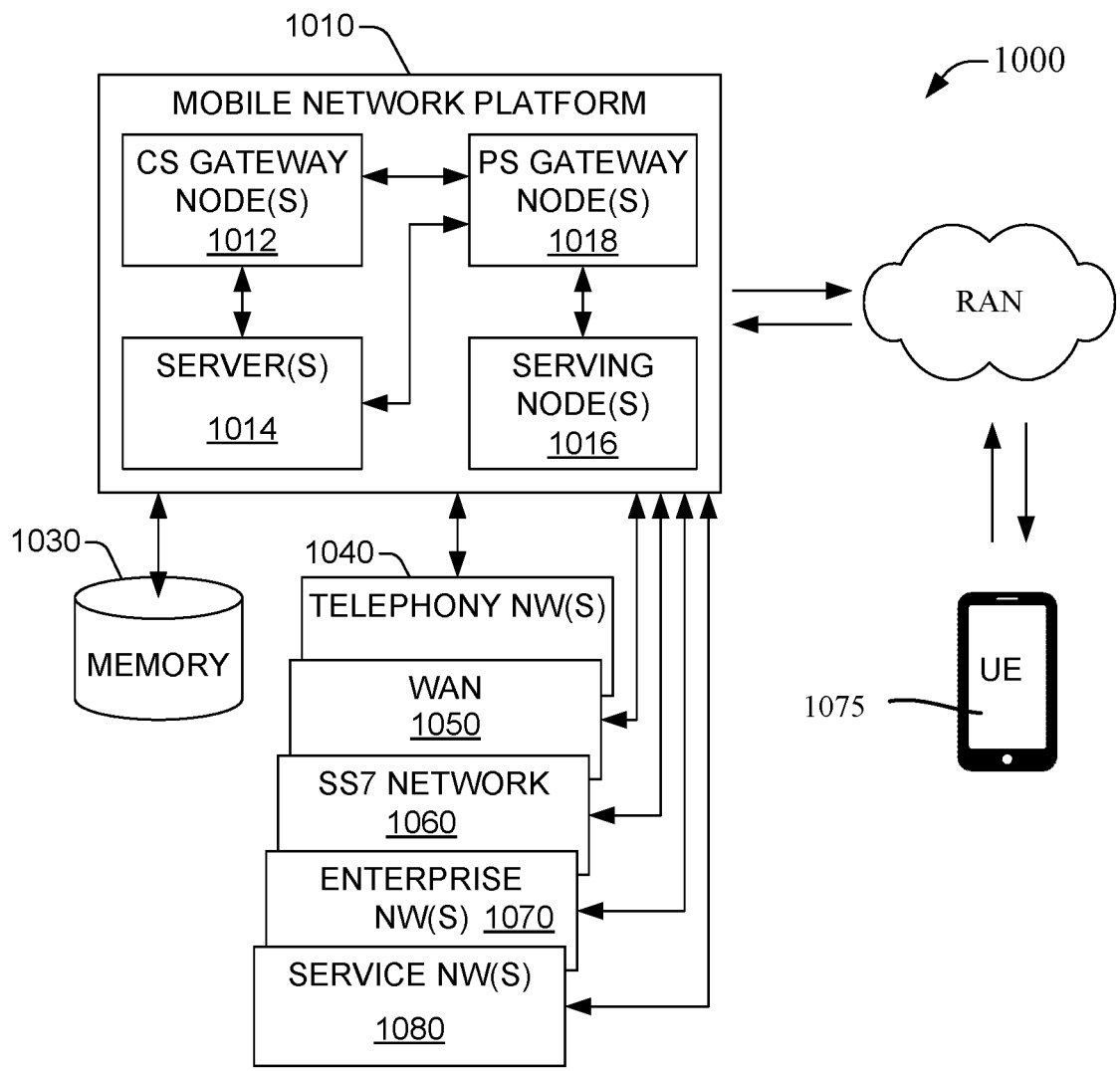
FIG. 10 is a block diagram of an example implementation of a mobile network platform to implement and exploit various features or aspects of the subject disclosure.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated.

To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 11 is but one example of a computing device.

Figure 11:
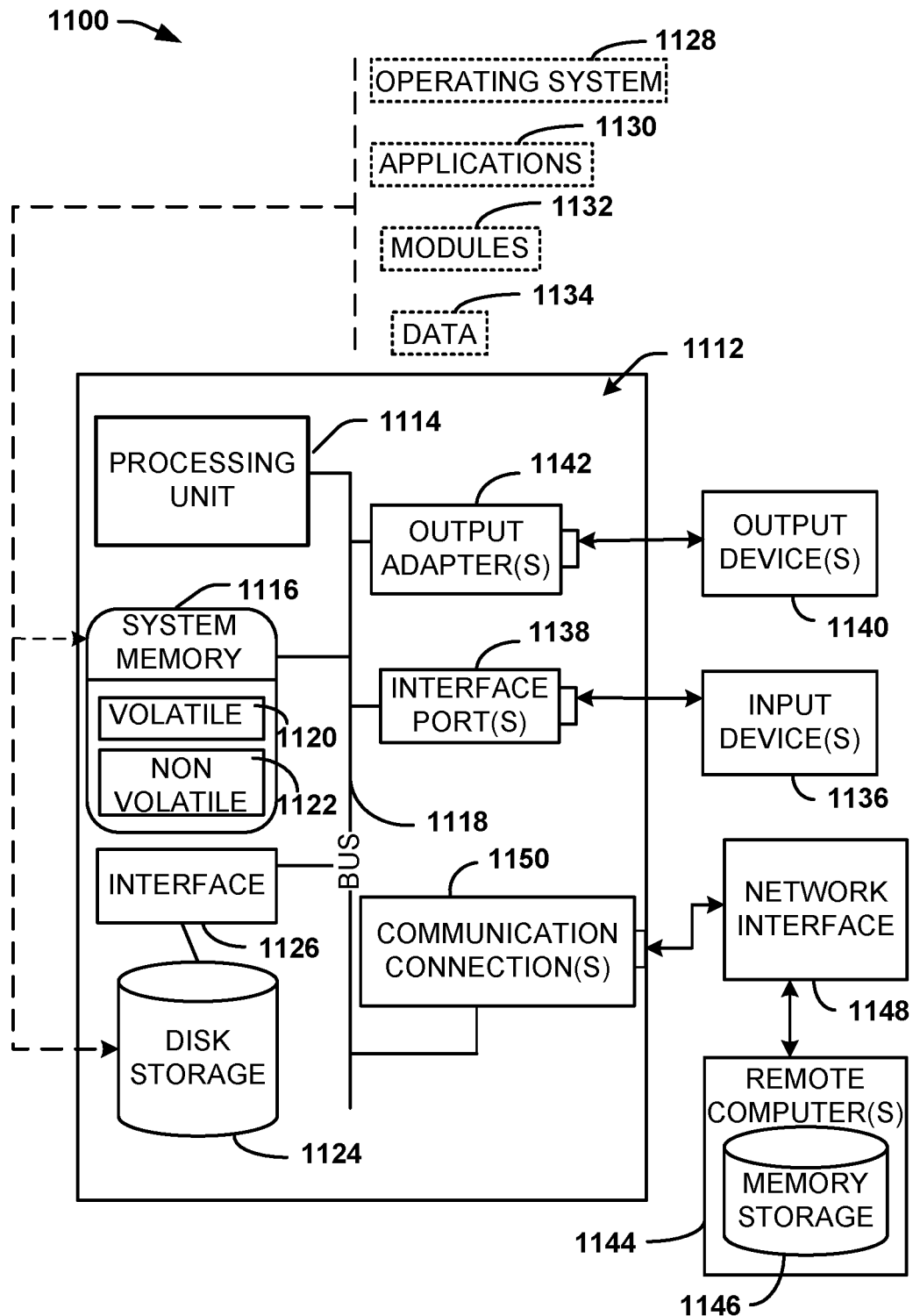
FIG. 11 illustrates a block diagram of a computing system operable to execute the disclosed systems and methods in accordance with an implementation.

In order to provide a context for the various aspects of the disclosed subject matter, FIG. 11 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of system 110, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, mobile device 112 and/or portable device 114 can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

One or more aspects are directed towards receiving, by a communication network device of a communications network and comprising a processor, information corresponding to a radio link interruption of a communication of data flow packets between a user equipment and a first distributed unit of distributed units of the communications network, and in response to the receiving the information corresponding to the radio link interruption, executing, by the communication network device, an inter-distributed unit beam switch. The executing comprises determining a target distributed unit of the distributed units based on a selection criterion, wherein the target distributed unit is different from the first distributed unit, and facilitating communicating the data flow packets between the user equipment and the target distributed unit.

Aspects may include stopping, by the communication network device, the communication of the data flow packets between the user equipment and the first distributed unit.

The communication network device may comprise a central unit communicatively coupled to the distributed units, and receiving the information corresponding to the radio link interruption may comprise receiving the information at the central unit from the first distributed unit based on detection by the first distributed unit of the radio link interruption. Determining the target distributed unit based on the selection criterion may comprise determining the target distributed unit based on a reported beam measurement.

Other aspects may include determining, by the communication network device, whether connectivity is already established with the target distributed unit based on the user equipment having multiple connectivity, and, in response to determining that the connectivity is not already established, establishing, by the communication network device, connectivity with the target distributed unit. Establishing the connectivity with the target distributed unit may comprise initiating a node addition procedure for the target distributed unit. Aspects may include determining, by the communication network device, whether connectivity is already established with the target distributed unit based on the user equipment having multiple connectivity, and, in response to determining that the connectivity is already established, providing, by the communication network device, an indication of the radio link interruption to a multiple connectivity flow control process executing on the communication network device.

Aspects may include determining, by the communication network device, whether connectivity is already established with the target distributed unit based on the user equipment having multiple connectivity, and, in response to determining that the connectivity is not already established, establishing, by the communication network device, connectivity with the target distributed unit, comprising initiating a node addition procedure for the target distributed unit, and, in response to determining that the connectivity is already established, providing, by the communication network device, an indication of the radio link interruption to a multiple connectivity flow control process executing on the communication network device.

Receiving the information corresponding to the radio link interruption may occur when no transmit receive points of the first distributed unit have a beam suitable for communication to the user equipment.

Aspects may comprise, based on a beam measurement report, facilitating restoring, by the communication network device, the communication of the data flow packets between the user equipment and the first distributed unit, and halting, by the communication network device, the facilitating of the communicating of the data flow packets between the user equipment and the target distributed unit. Based on at least one beam measurement report, facilitating restoring, by the communication network device, the communication of the data flow packets between the user equipment and the first distributed unit may comprise communicating first data packets of the data flow packets to the first distributed unit and communicating second data packets of the data flow packets other than the first data packets to the target distributed unit.

One or more aspects are directed to a processor and a memory that stores executable instructions that, when executed by the processor, facilitate performance of operations, comprising, in connection with executing a multiple connectivity flow control process, receiving first information from a first secondary node device of a group of secondary node devices indicating that a radio link interruption exists between the first secondary node device and a user equipment. Aspects include selecting a target secondary node device from the group of secondary node devices based on a selection criterion and in response to providing information corresponding to the target secondary node device to the multiple connectivity flow control process, facilitating switching of communication with the user equipment from the first secondary node device to the target secondary node device.

The processor and memory may be components of a master next generation node B device. The selection criterion may be based on a beam quality criterion, and the operations may comprise receiving quality of beam data, and analyzing the quality of beam data relative to the selection criterion to determine whether the selection criterion is satisfied.

The operations may further comprise determining that connectivity is not established with the target secondary node device, and facilitating establishing connectivity with the target secondary node device, comprising initiating a node addition procedure for the target secondary node device. The operations further may comprise determining that connectivity is already established with the target secondary node device, and providing an indication corresponding to the radio link interruption to the multiple connectivity flow control process. The operations further may comprise restoring communication between the first secondary node device and the user equipment based on receiving a beam measurement report.

One or more aspects are directed to receiving a report from a first node device of node devices, the report indicating that a radio link interruption has occurred to a first data flow communication between the first node device and a user equipment, and selecting a target node device from the node devices that is different from the first node device. In response to determining that connectivity is not already established with the target node device, described herein is initiating a node addition procedure to establish connectivity with the target node device, and in response to determining that multiple connectivity is already established with the target node device, notifying a flow controller of the radio link interruption between the first node device and the user equipment, facilitating the flow controller to establish a second data flow communication between the target node device and the user equipment.

Selecting the target node device may comprise evaluating first beam quality data of the target node device reported by the user equipment and second beam quality data of a second node device reported by the user equipment, and wherein the second node device is other than the first node device and the target device. The operations further may comprise restoring the first data flow communication between the first node device and the user equipment based on beam restoration information received from the first node device.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
 facilitating, by network equipment comprising a processor, a first connection being established between a first distributed unit and a second distributed unit, wherein a user equipment has established dual connectivity with the first distributed unit and the second distributed unit, resulting in a data flow of packets between the network equipment and the user equipment via the first distributed unit and a second connection between the user equipment and the second distributed unit, wherein a signal of the data flow of packets comprises a millimeter wave signal in accordance with a fifth generation network radio access network protocol;

receiving, by the network equipment, from the first distributed unit, signal information comprising:
- a first beam measurement report comprising a change in signal strength, as compared to a threshold, of the signal of the data flow of packets, the signal information being generated by the first distributed unit in response to detection of the change in signal strength by the first distributed unit,
- a second beam measurement report, generated by the second distributed unit, and
- an indication that the detected change in signal strength is predicted to be temporary, according to a defined likelihood criterion; and based on the signal information, utilizing a data link layer flow control protocol to perform, by the network equipment, operations comprising:
- selecting the second distributed unit as a target distributed unit to maintain the data flow of packets between the network equipment and the user equipment via the target distributed unit, and
- facilitating communicating the data flow of packets between the user equipment and the target distributed unit.

2. The method of claim 1, further comprising:
facilitating, by the network equipment, stopping the data flow of packets via the first distributed unit.

3. The method of claim 1, further comprising:
verifying, by the network equipment, the second connection between the user equipment and the second distributed unit, wherein the selecting the second distributed unit as the target distributed unit is based on the verifying the second connection.

4. The method of claim 1, wherein the selecting the second distributed unit as the target distributed unit is based on a number of previous radio link interruptions of communication between the user equipment and the second distributed unit and a current load being handled by the second distributed unit.

5. The method of claim 1, wherein the first beam measurement report comprising the change in signal strength, as compared to the threshold comprises a reduction in signal strength below a threshold strength.

6. The method of claim 5, wherein the reduction in signal strength below the threshold strength comprises the reduction in signal strength below the threshold strength over a period of time.

7. The method of claim 1, wherein the reduction in signal strength below the threshold comprises an interruption of the of the data flow of packets between the user equipment and the first distributed unit.

8. The method of claim 1, further comprising, providing, by the network equipment, an indication of the change in signal strength, as compared to the threshold to the flow control protocol executing on the network equipment.

9. The method of claim 1, wherein the first beam measurement report comprising the change in signal strength, as compared to the threshold comprises a reduction in quality of a beam pair link of a control channel between the first distributed unit and the user equipment below a quality threshold.

10. The method of claim 1, further comprising, facilitating restoring, by the network equipment, the data flow of packets via the first distributed unit comprising communicating first data packets of the data flow of packets to the first distributed unit and communicating second data packets of the data flow of packets other than the first data packets to the target distributed unit.

11. The method of claim 1, wherein the dual connectivity comprises dual connectivity established in accordance with the fifth generation network radio access network protocol.

12. A system, comprising:
a processor; and
a memory that stores executable instructions that, when executed by the processor, facilitate performance of operations, comprising:
- facilitating, in connection with executing a multiple connectivity data link layer flow control protocol, a first connection being established between a first secondary node device and a second secondary node device, a second connection being established, as a primary connection between the first secondary node device and a user equipment, and a third connection being established between the second secondary node device and the user equipment, wherein a beam of the primary connection comprises a millimeter wave beam in accordance with a fifth generation network radio access network protocol;
- receiving signal information from the first secondary node device, describing:
  - a radio link interruption between the first secondary node device and the user equipment, and
  - an indication that the radio link interruption is predicted to be temporary, according to a defined likelihood criterion, wherein the first information comprises a beam measurement report based on a measurement, by the user equipment, of the beam of the primary connection, and wherein the first information was generated based on the radio link interruption by the first secondary node device;
- selecting, based on the signal information, the second secondary node device as a target secondary node device based on a selection criterion; and
- facilitating switching of the primary connection with the user equipment from the second connection to the third connection with the second secondary node device as the target secondary node device.

13. The system of claim 12, wherein the processor and memory are components of a master next generation node B device.

14. The system of claim 12, wherein the selecting the second secondary node device as the target secondary node device is further based on a number of previous radio link interruptions of communication between the user equipment and the first secondary node device.

15. The system of claim 12, wherein the facilitating, in connection with executing the multiple connectivity data link layer flow control protocol, the first connection being established between the first secondary node device and the second secondary node device comprises between the first secondary node device and the second secondary node device by initiating a node addition procedure for the second secondary node device.

16. The system of claim 12, wherein the operations further comprise providing an indication corresponding to the radio link interruption to the multiple connectivity data link layer flow control protocol.

17. The system of claim 12, wherein the operations further comprise restoring communication between the first secondary node device and the user equipment.

18. A non-transitory machine-readable medium, comprising executable instructions that, when executed, facilitate performance of operations, comprising:
  receiving a report from a first node device, part of a group of node devices, the report indicating that:
    a radio link interruption has occurred to a first data flow communication between the first node device and a user equipment, and
    an indication that the radio link interruption is predicted to be temporary, according to a defined likelihood criterion, wherein a signal of the first data flow communication comprises a millimeter wave signal in accordance with a fifth generation network radio access network protocol;
  selecting a target node device from the group of node devices that has established dual connectivity with the first node device based on a selection criterion; and
  notifying a flow controller of the radio link interruption between the first node device and the user equipment, thereby facilitating the flow controller to utilize a data link layer flow control protocol to switch the first data flow communication to be between the target node device and the user equipment, wherein the selection criterion is applied to a beam measurement report and received by a second data flow from the target node device, wherein the beam measurement report comprises a measurement, by the user equipment, of a beam of the third connection between the user equipment and the target node device, and wherein the selection criterion is applied to the measurement of the beam.

19. The non-transitory machine-readable medium of claim 18, wherein the selection criterion is further applied to a number of previous radio link interruptions of previous communication between the user equipment and the first node device.

20. The non-transitory machine-readable medium of claim 18, wherein the operations further comprise restoring the first data flow communication between the first node device and the user equipment based on beam restoration information received from the first node device.

* * * * *